Sept. 6, 1927.
D. MUNRO
1,641,287
STOCK CAR
Filed Jan. 16, 1925
2 Sheets-Sheet 1
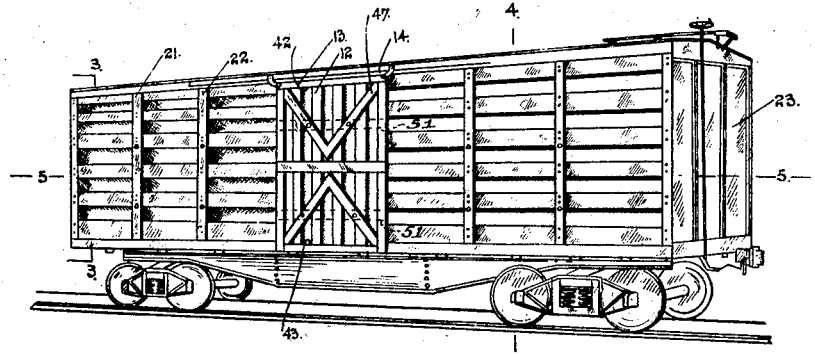
FIG. 1.
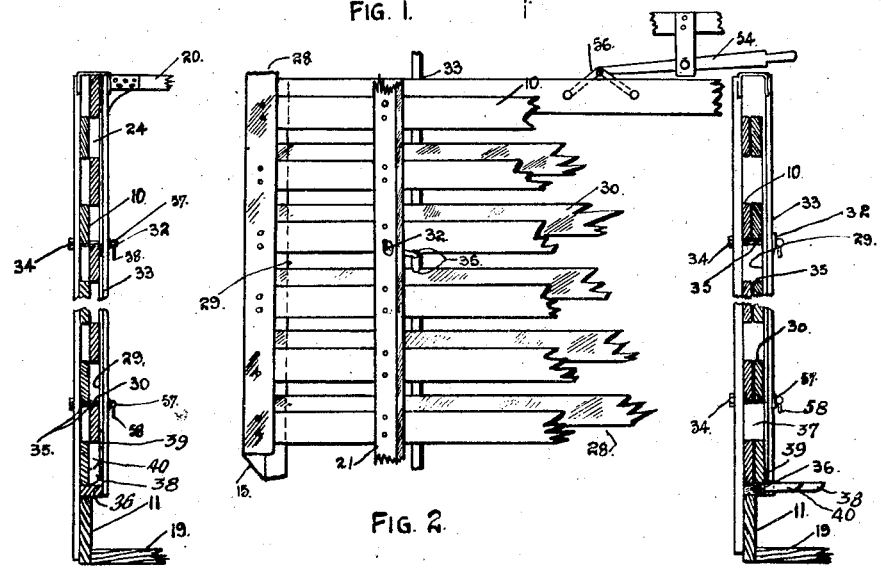
FIG. 2.
FIG. 3.   FIG. 4.
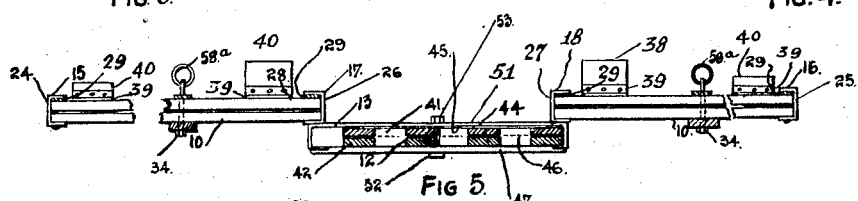
FIG. 5.
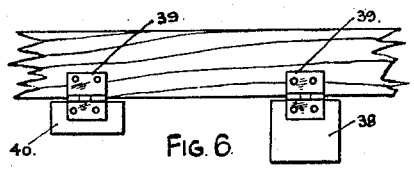
FIG. 6.
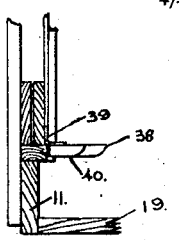
FIG. 7.
Inventor.
D. Munro.
By
E. J. Fetherstonhaugh.
Attorney.

Sept. 6, 1927.  D. MUNRO  1,641,287
STOCK CAR
Filed Jan. 16, 1925   2 Sheets-Sheet 2

Inventor.
D. Munro
By
E. J. Fetherstonhaugh
Attorney.

Patented Sept. 6, 1927.

1,641,287

UNITED STATES PATENT OFFICE.

DONALD MUNRO, OF MONTREAL, QUEBEC, CANADA.

STOCK CAR.

Application filed January 16, 1925. Serial No. 2,840.

The invention relates to a stock car, as described in the present specification and illustrated in the accompanying drawings that form part of the same.

The invention consists essentially of the novel features of construction pointed out in the claim for novelty following a description containing an explanation in detail of an acceptable form of the invention.

The objects of the invention are to insure comfort for cattle, horses and other animals in transit by railway during all weathers, thereby avoiding inhumane treatment of the stock and incidentally saving heavy depreciation thereof as well as death and disease and the consequent property loss; to enable the attendants to give constant care notwithstanding the sudden and severe changes in temperature due to varying climatic conditions during comparatively long journeys extending over many differently situated sections of country; to furnish the railways with a car readily convertible to many uses at slack times of the year in the livestock trade; to accomplish these purposes in a simple and economical manner suitable for new structures and equally serviceable for application to existing livestock cars; to eliminate any rattling that might occur by the provision of this convenience; to further the interests of the exporter and at the same time save considerable loss to the railway companies; and generally to provide in railway rolling stock increased facilities for the transportation of cattle and other livestock.

In the drawings, Figure 1 is a perspective view of a stock car showing one portion in the closed position for severely cold weather or heavy storms and the other portion open for summer weather.

Figure 2 is a fragmentary view of the side wall, showing an intermediate position for moderate weather.

Figure 3 is a vertical sectional view on the line 3—3 in Figure 1.

Figure 4 is a vertical sectional view on the line 4—4 in Figure 1.

Figure 5 is a longitudinal sectional view on the line 5—5 in Figure 1.

Figure 6 is a detail showing a rear view of the wedge blocks.

Figure 7 is a detail showing a side view of the wedge blocks.

Like numerals of reference indicate corresponding parts in the various figures.

Figure 8:
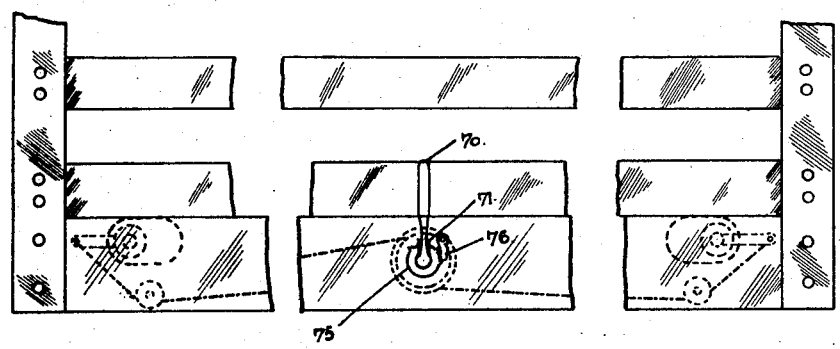
Figure 8 is a plan view of a portion of a side wall showing a sliding slat frame broken away, and the means for raising it to a closed position.
Figure 9:
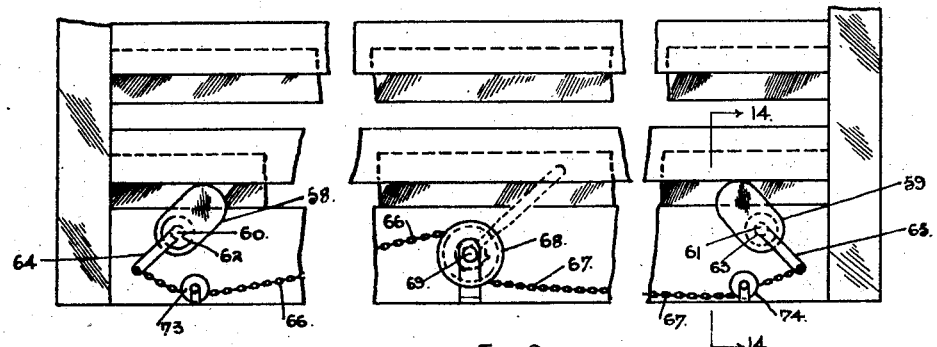
Figure 9 is a plan view of a portion of a side wall, showing the fixed and sliding slat frames broken away and the means for raising the sliding frame in the intermediate position.

Referring to the drawings, the frame of the car is preferably of metal following the modern form of structure and is made to support the spaced horizontal slats 10 of metal or wood above the base board 11, these slats and base boards forming the side walls around a door which is formed of the spaced vertical slats 12 secured to a frame 13 and slidably hung over a door frame 14 as customary in car construction.

The slats 10 and base boards 11 are permanently secured to the end channel iron posts 15 and 16 of the main frame and to the uprights 17 and 18 of the door frame 14 and are built up above the floor 19, to the roof beams 20.

The intermediate braces 21 and 22 stiffen the slats 10 and base boards 11 and are themselves secured to the frame of the car. The end walls 23 are shown as solid in the drawings. This structure constitutes a ventilated car for cattle as usual in car construction. The outer permanent walls secured to the channels 15 and 16 leave the slideways 24 and 25 therebehind as the channels are wide enough for a double wall.

The posts of the door frame 14 likewise form the slideways 26 and 27 and the ends of the slat frames 28 extend into said slideways and are spaced by the bars 29. and are vertically slidable in uprights. The slat frames 28 are formed of the vertical bars 29 and horizontal slats 30 secured to said bars 29 and spaced thereby and may be reinforced by the diagonal braces 31.

The bolts 32 extend through the vertical braces 21 of the outer permanent frame and through the inner vertical guide bars 33 and are secured by the nuts 34 and thus hold the sliding slat frames between the guide bars 33 and outer slats 10 to prevent rattling. The slats contiguous to the bolts 32 are slotted at 35 to make room for the bolts without interfering with the movement of the slat frames 28.

The slat frames 28 normally rest on surbases 36 at the top of the base boards 11 and this leaves the spaces 37 clear from end to end for ventilation in summer but the said frames 28 are movable upwardly to close said spaces 37 by means of the slats 30 and are ordinarily held snug enough to remain up though to insure their remaining in the upper position, they may be held by the hinged props 38 inserted between the lower slat members and the surbases 36, these props being secured to the frames 28 or surbases 36 by the hinges 39. Likewise the props 40 of a smaller size may be used for the intermediate position of the slats for partially closing the spaces 37.

The slat frame 41 moves sideways in the door frame 13 in the slideways 42 and 43 in the upper and lower bars of said frame 13. The frame 41 is formed of the vertical slats 44 spaced and secured to the cross bars 45 and moving across to close the spaces 46 and held by any suitable fastening means.

The cross bars 47 bracing the permanent slats 12 are joined to the inner permanent guide bars 51 by the bolts 52 and nuts 53, which may be tightened to hold the frames 41 and 42 properly snug and thereby prevent rattling.

The doors are hung in any suitable manner usually with trolleys running on rails, as that is a matter for ordinary car construction and forms no part of this invention, which is chiefly concerned in the slidable inner slat frames adapted to close the spaces and thereby keep the bitter cold winds from penetrating into the car interior.

In Figure 2 a means for closing the slat frames is shown in handle 54 pivoted in the bar 55 rigidly secured to the car frame, said lever being pivotally secured to the angle bracket 56 bolted to the centre of an upper slat.

The bolts are preferably made with the heads 57 forming eyes for the bull rings 58 which are used for tying the animals' heads to avoid goring and other accidents. The nuts 34 for these bolts are secured on the outside of the car body.

In the operation of the invention the sliding slat frames normally rest on the surbases or ledges and in this position the ventilating openings are wide open and to close the same the slat frames are lifted in their slideways and cover the openings so that the side walls are completely closed. The props are inserted under the lower slats and rest on the surbases and this insures the closing of the spaces so long as said blocks are in that position. To lower the frames the blocks are knocked out and the slat frames pulled down to the surbases. The sliding slat frames in the doors move sideways though where the permanent slats are across the door the movement will be precisely the same as already described.

The simplest construction and operation have thus been described but in figures 8 to 14 probably the preferable form of operating gear is shown as undoubtedly the sliding frames in the cars containing this invention will be quite heavy and be liable to jamming, therefore a positive mechanism is desirable, especially a gear having considerable lifting force.

The cam blocks 58 and 59 are fixedly mounted on the shafts 60 and 61 which are journalled in the bearings 62 and 63 secured in the base boards of the wall and these shafts 60 and 61 have the crank arms 64 and 65 respectively projecting therefrom.

The arms 64 and 65 are connected by the chains 66 and 67 to the reel 68 fixedly mounted on the shaft 69, which is operated by the handle 70, the latter being preferably inserted in a socket arm 71 fixedly mounted on the reel shaft 69. The chains 66 and 67 are attached to the reel 68 at opposite sides so that by turning the shaft 69 by means of the handle 70, the crank arms 64 and 65 are operated and this rotates the shafts 60 and 61 and coincidently the cams 58 and 59. The cams 58 and 59 engage the lower slat of the sliding frame at opposite ends and as they continue to turn they lift the whole frame to close the spaces between the permanent slats.

The shaft 69 projects outwardly through the car wall, therefore the handle 70 is on the outside of the car on either side and either end, while the cams are on the inside of the outer walls under the sliding frames, being closed in by the sheet iron shields 72 that protect the mechanism from foreign matter.

The chains 66 and 67 extend around pulleys 73 and 74 below the shafts 60 and 61 and it may be required to offset the crank arms 64 and 65 to properly clear the parts.

The ratchet 75 is shown as holding the slat frame to its open position cooperating with the pawl 76 pivotally secured to the car body. The ratchet is formed with a few teeth and is mounted on the lever shaft and is adapted to hold the slat frame in fully closed and partly closed positions.

Figures 10, 11, 12, 13:
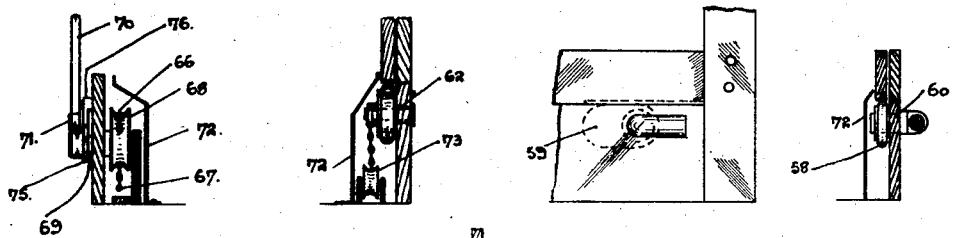
Figure 10 is a detail showing an end elevation of the lever and chain wheel and the car wall base in section.
Figure 11 is a detail of the raising cam showing the slats in section.
Figure 12 is a detail of the operating handle and cam showing a slightly modified form.
Figure 13 is an end view of the mechanism illustrated in Figure 12.
Figure 14:
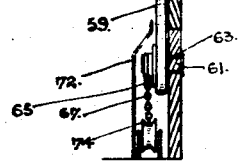
Figure 14 is a vertical sectional view on the line 14—14 in Figure 9.

In Figures 12 and 13 the handle is mounted directly on the shafts 60 and 61 otherwise the construction is precisely the same.

It may be that the handles will not be removable, but to avoid mischievous interference with the gear by unauthorized persons it is advisable to detach this handle.

Furthermore it is desirable to handle these sliding frames from the outside as during the journey the attendants will find it more convenient.

What I claim is:—

In a stock car, side walls having permanent base boards and permanently spaced slats parallel therewith, vertical posts secured to the outsides of said slats, vertical posts secured to the insides of said outer posts and spaced therefrom and forming slideways, sliding frames formed of horizontal slats adapted to fill up said spaces and having vertical braces, fastening members holding the slideways in place, tethering rings secured to and flexibly held by said fastening members, and means operated by levers for lifting and lowering the sliding frames.

Signed at Montreal, Canada, this 5th day of January, 1925.

DONALD MUNRO.